Jan. 19, 1971　　　　　　　C. D. HERR　　　　　　3,555,827
METHOD AND APPARATUS FOR PREVENTING ICE FISHING
HOLES FROM FREEZING CLOSED WHEN NOT IN USE
Filed May 12, 1969　　　　　　　　　　　　2 Sheets-Sheet 1
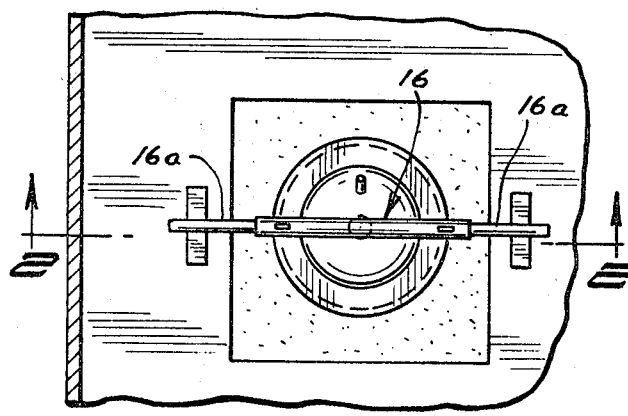
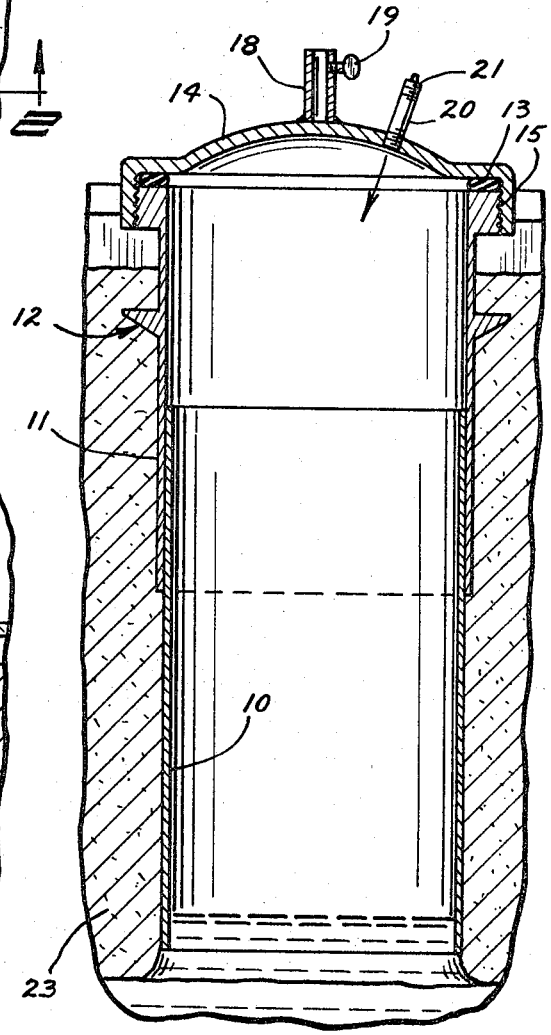
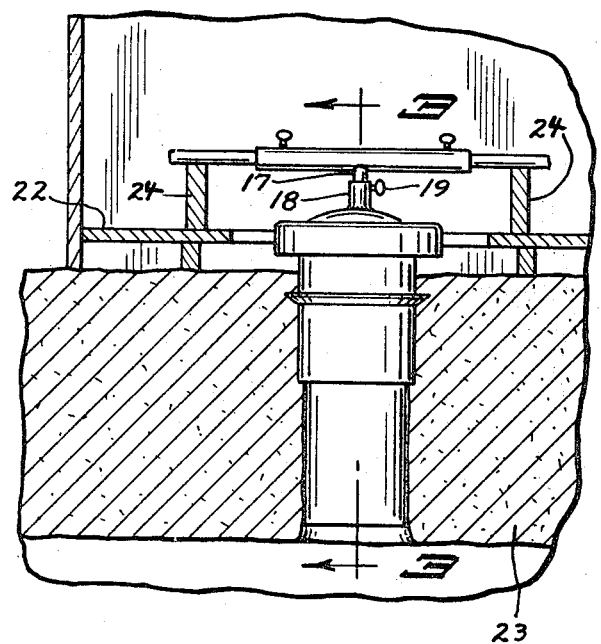
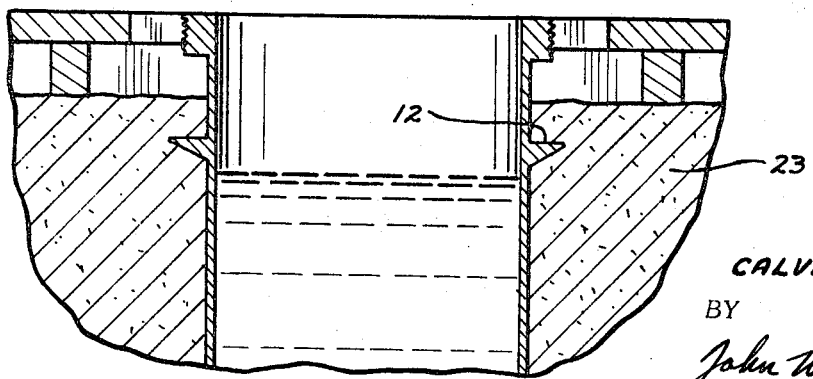
INVENTOR.
CALVIN D. HERR
BY
*John W. Adams*
ATTORNEY

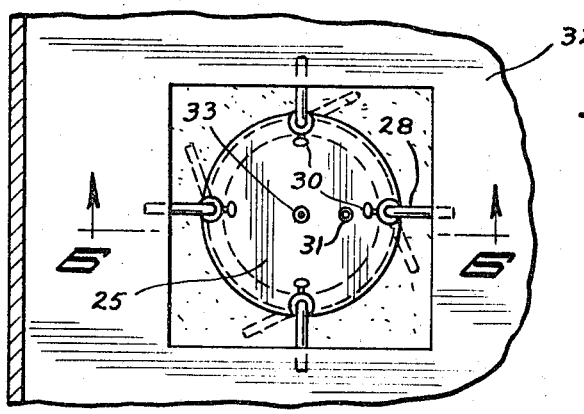
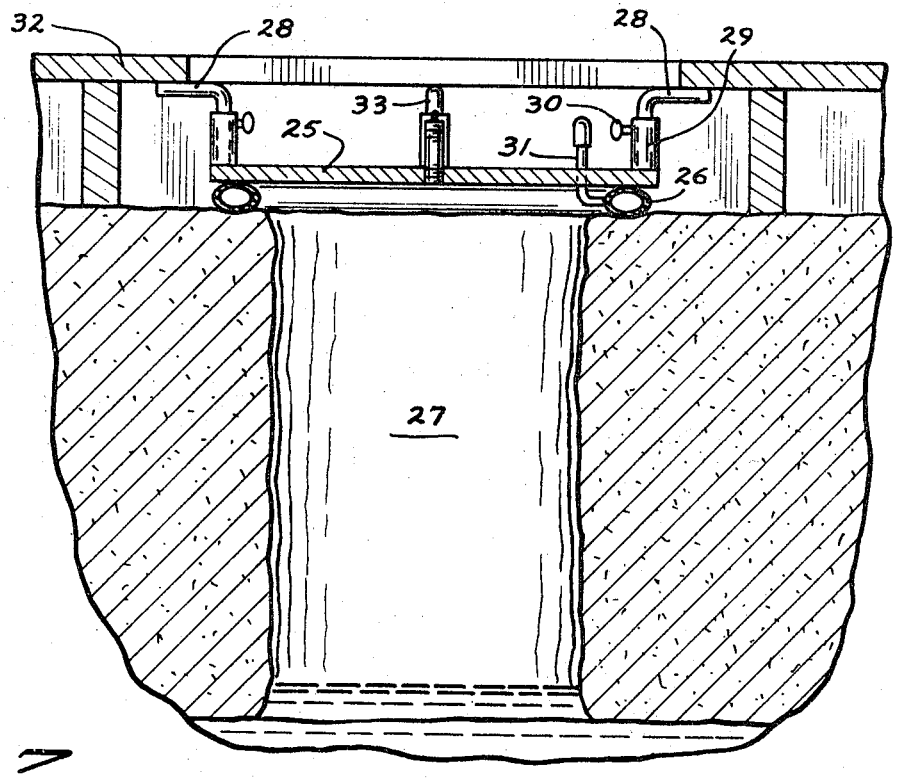
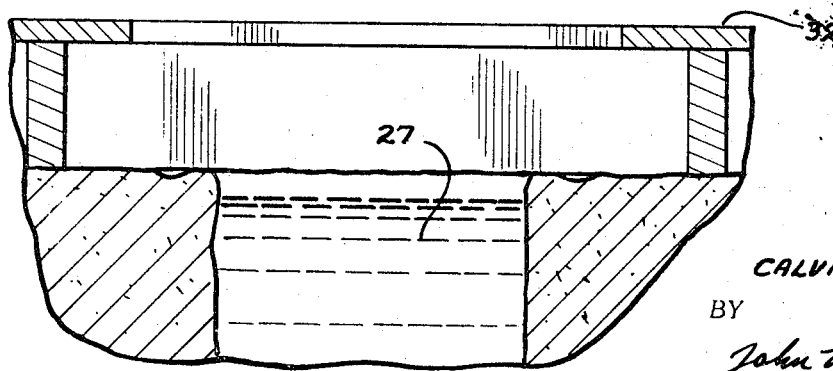

United States Patent Office 3,555,827
Patented Jan. 19, 1971

---

3,555,827
METHOD AND APPARATUS FOR PREVENTING ICE FISHING HOLES FROM FREEZING CLOSED WHEN NOT IN USE
Calvin D. Herr, 2941 Fremont Ave. N.,
Minneapolis, Minn. 55411
Filed May 12, 1969, Ser. No. 823,737
Int. Cl. E02b 1/00
U.S. Cl. 61—1                                10 Claims

ABSTRACT OF THE DISCLOSURE

This invention relates to apparatus adapted to force the water down to the bottom of a fishing hole to prevent the same from freezing up when not in use and this invention also relates to the method of keeping the fishing hole free of ice by maintaining air pressure therein when not in use.

---

Ice fishermen have been constantly plagued with the problem of their fishing holes freezing closed when not in use. This requires reopening of the hole each time they go fishing. This is even true in a fish house which provides shelter over the fishing hole. Normally a fisherman would have to use an ice chisel or auger to reopen the hole before he can begin fishing and this is not only time consuming but also requires substantial effort.

It is an object of the present invention to provide a method and apparatus for preventing a fishing hole from refreezing when not in use.

More specifically, it is an object to provide a method and apparatus for keeping an ice fishing hole from freezing up by maintaining a positive air pressure within the hole when not in use to force the water level down to the bottom of the hole.

It is another object to provide cover means for providing a sealed cover over the fishing hole to permit air pressure to be supplied and maintained within the hole when not in use to force the water level to the bottom of the hole and prevent the same from freezing up.

It is a further object to provide apparatus including a shell adapted to be inserted in sealed relation into a preformed fishing hole which will maintain the desired size and shape of the hole and which is provided with means for forcing the water level down to the bottom of the hole by maintaining air pressure within the hole when the same is not in use.

It is another object to provide a modified form of the invention embodying a cover having annular sealing means for engagement with the ice surface around a fishing hole to provide a sealed chamber adapted to maintain a positive air pressure within the fishing hole to force the water level therein down to the bottom thereof when not in use.

These and other objects and advantages of this invention will be apparent from the following descriptions made in connection with the accompanying drawing wherein like reference characters refer to similar parts throughout the several views, and in which:

FIG. 1 is a top plan view showing one form of my invention mounted in a fishing hole;

FIG. 2 is a side elevational view thereof;

FIG. 3 is a vertical sectional view taken substantially along the line 3—3 of FIG. 2;

FIG. 4 is a fragmentary view similar to FIG. 3 with the cover removed;

FIG. 5 is a top plan view of a modified form of the invention;

FIG. 6 is a vertical sectional view taken substantially along the line 6—6 of FIG. 5; and FIG. 7 is a view similar to FIG. 6 with the cover removed.

One form of the invention is illustrated in FIGS. 1 through 4. In this form of the invention a shell having a pair of telescoping sections 10 and 11 is provided and inserted into a fishing hole formed through the ice. The outside diameter of the shell sections is approximately the same as the diameter of the hole formed by the ice auger. An upper section 11 has an annular stop collar 12 fixed thereto which is adapted to freeze into the ice sealing the hole and positively preventing longitudinal movement of the upper shell after the same has been initially inserted and frozen into the hole.

The upper end of the section 11 has a flange 13 formed thereon which is adapted to receive, in sealed relation, a cover 14, such as by the threaded connection 15. The cover 14 has a positioning cross-bar 16 removably mounted thereon as by the depending rod or pin 17 which is received into a sleeve 18 and is held in place by any suitable means such as a set screw 19. The cross-bar 16 may have a pair of telescopically extensible arms 16a to permit the length thereof to be adjustably varied.

The cover 14 has a compressed air inlet 20 with a conventional normally closed spring valve 21 of a type similar to that used in pneumatic automobile tires and this permits air pressure to be supplied to the chamber formed within the shell when the cover section is connected in sealed relation to the top thereof. The collar 12 positively prevents upward shifting movement of the upper shell section 11 when air pressure is applied thereto and, as is clearly shown in FIGS. 2 and 3, the air pressure forces the water level down to the bottom of the fishing hole and prevents the same from freezing during the period when the same is not in use. Obviously when the fishing hole is to be used the air pressure is released and the cover 14 removed.

In order to install my shell into the fishing hole a hole is initially drilled through the ice 23 by an auger of a size to receive the shell sections 10 and 11 therein and these shell sections will freeze into the ice at the desired elevation. This elevation may be maintained until said sections are frozen in place by means of the cross-bar 16 set screwed to the cover 14 as illustrated. The cross-bar may be placed on suitable blocks 24 supported by the floor 22 of the fish house.

Another form of the invention is illustrated in FIGS. 5 through 7 wherein the use of the shell is eliminated and a cover section designated by the numeral 25 is provided for covering the top of the fishing hole. A gasket 26 is secured around the outer marginal portion of the cover plate 25 and the plate is held down against the surface of the ice around the fishing hole 27 as by the hold down brackets 28 which in the form shown are vertically adjustable within respective sleeves 29 as by the set screws 30. In the form illustrated the hollow pneumatic gasket 26 is positively sealed against the surface of the ice by inflating the gasket through the valved conduit 31. The hold down brackets 28 are swung over into underlying engagement with fish house floor 32 in order to positively hold the cover plate 25 down against the ice surface. Air is supplied through a valved conduit 33 under pressure directly to the fish hole 27 to force the water level therein down to the bottom thereof.

As in the first described form of the invention, air pressure is used to maintain the water level within the fishing hole down at the bottom thereof to substantially eliminate any freezing when the hole is not in use, and it will be seen that I have provided a relatively simple yet highly efficient method and apparatus for preventing the fishing hole from freeding up when the same is not being used.

It will of course be understood that various changes may be made in the form, details, arrangements and proportion of the parts without departing from the scope

What is claimed is:

1. The method of preventing ice fishing holes from freezing when not in use consisting in initially sealing the top of the ice fishing hole with a removable cover and introducing gas pressure into said hole to lower the water level therewithin to the bottom of the hole.

2. The method set forth in claim 1 and the gas under pressure constituting air.

3. Apparatus for preventing ice fishing holes from freezing comprising a cover for sealing the top of an ice fishing hole and having an air inlet passage formed therein, a check valve in said passage to permit gas under pressure to be introduced and maintained in said fishing hole.

4. The structure set forth in claim 3 and a shell surrounding said hole in sealed relation to the ice defining the same and said cover having a removable connection with the upper end of said shell to provide a sealed chamber within said hole.

5. The structure set forth in claim 4 and said shell having two telescoping sections to permit adjustment of the length thereof.

6. The structure set forth in claim 4 and said shell having outwardly extending stop means for positively engaging the surrounding ice to prevent upward movement of the shell when the chamber within said shell is under pressure.

7. The structure set forth in claim 4 and a laterally extending support mounted on the upper portion of said cover for engaging the floor of a fish house to support the shell and cover in the desired vertical position within the fishing hole until the shell has frozen into said hole.

8. The structure set forth in claim 7 and the length of said laterally extending support being adjustable.

9. The structure set forth in claim 3 and said cover being larger than the diameter of the fishing hole in the ice to provide a marginal peripheral portion overlying the ice surrounding said hole and gasket means of said peripheral portion for sealing and engaging the ice surface to provide a sealed chamber within the ice fishing hole and means for holding the gasket down in sealed relation to the ice surface.

10. The structure set forth in claim 9 and the gasket being inflated to accommodate irregularities in the engaged ice surface.

References Cited

UNITED STATES PATENTS

| | | | |
|---|---|---|---|
| 2,515,770 | 7/1950 | Gronberg | 137—272 |
| 2,747,569 | 5/1956 | Holm et al. | 43—4 |
| 2,799,146 | 7/1957 | Meagher | 61—1X |
| 2,838,196 | 6/1958 | Chapman | 61—1X |
| 2,877,595 | 3/1959 | Steuart | 61—1X |
| 2,914,926 | 12/1959 | Meagher | 61—1X |
| 2,991,623 | 7/1961 | Morton et al. | 61—1 |
| 3,025,852 | 3/1962 | Quilling | 61—1X |
| 3,056,272 | 10/1962 | Eilers | 43—4X |
| 3,230,655 | 1/1966 | Nomsen | 61—1X |
| 3,466,781 | 9/1969 | Nelson et al. | 43—4 |

PETER M. CAUN, Primary Examiner

U.S. Cl. X.R.

43—4